(12) United States Patent
Zhu et al.

(10) Patent No.: US 8,270,191 B2
(45) Date of Patent: Sep. 18, 2012

(54) POWER GENERATION SYSTEM, POWER CONVERTER SYSTEM, AND METHODS OF CONVERTING POWER

(75) Inventors: Huibin Zhu, Westford, MA (US); Allen Ritter, Roanoke, VA (US); Scott Charles Frame, Boones Mill, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/971,810

(22) Filed: Dec. 17, 2010

(65) Prior Publication Data

US 2011/0299311 A1   Dec. 8, 2011

(51) Int. Cl.
*H02M 7/5387* (2007.01)
(52) U.S. Cl. ..................................................... 363/132
(58) Field of Classification Search ............... 363/17, 363/41, 56.02, 95, 97, 98, 131, 132
See application file for complete search history.

(56) References Cited

U.S. PATENT DOCUMENTS

| | | | |
|---|---|---|---|
| 5,526,252 A | 6/1996 | Erdman | |
| 6,118,676 A * | 9/2000 | Divan et al. | 363/34 |
| 6,784,634 B2 | 8/2004 | Sweo | |
| 7,006,366 B2 * | 2/2006 | Panda et al. | 363/70 |
| 7,050,311 B2 * | 5/2006 | Lai et al. | 363/37 |
| 7,372,174 B2 | 5/2008 | Jones et al. | |
| 7,423,894 B2 * | 9/2008 | Ilic | 363/132 |
| 7,476,987 B2 | 1/2009 | Chang | |
| 7,511,385 B2 | 3/2009 | Jones et al. | |
| 7,518,886 B1 * | 4/2009 | Lai et al. | 363/17 |
| 7,557,464 B2 * | 7/2009 | Wang et al. | 307/65 |
| 7,656,052 B2 | 2/2010 | Jones et al. | |
| 7,692,321 B2 | 4/2010 | Jones et al. | |
| 7,755,209 B2 | 7/2010 | Jones et al. | |
| 8,031,495 B2 * | 10/2011 | Sachdeva et al. | 363/71 |

\* cited by examiner

*Primary Examiner* — Adolf Berhane
(74) *Attorney, Agent, or Firm* — James McGinness, Esq.; Armstrong Teasdale LLP (57) ABSTRACT

A power converter system includes an inverter including a first bridge and a second bridge, wherein each of the first bridge and the second bridge includes at least one switch. The power converter system also includes an inductor including a first winding coupled to an output of the first bridge and a second winding coupled to an output of the second bridge.

20 Claims, 4 Drawing Sheets

POWER GENERATION SYSTEM, POWER CONVERTER SYSTEM, AND METHODS OF CONVERTING POWER

BACKGROUND OF THE INVENTION

The subject matter described herein relates generally to power systems and, more particularly, to a power generation system, a power converter system, and methods of converting power.

In some known renewable energy power systems, direct current (DC) electrical power is generated from at least one renewable energy source. Such renewable energy sources may include wind, solar, geothermal, hydro, biomass, and/or any other renewable energy source. To properly couple such power systems to an electrical grid, the electrical power must be converted to alternating current (AC). At least some known power systems use a power converter to convert DC power to AC power.

Such conversion from DC power to AC power typically produces one or more variations in the voltage and/or current components of the AC power generated. To reduce such variations, at least some known power converters use one or more inductors to filter the current and/or voltage generated by the power converters. More specifically, in at least some known power converters, at least one inductor is coupled to each output of the power converters. The use of such inductors, however, undesirably increases a cost of the power converters.

BRIEF DESCRIPTION OF THE INVENTION

In one embodiment, a power converter system is provided that includes an inverter including a first bridge and a second bridge, wherein each of the first bridge and the second bridge includes at least one switch. The power converter system also includes an inductor including a first winding coupled to an output of the first bridge and a second winding coupled to an output of the second bridge.

In another embodiment, a power generation system is provided that includes at least one power generation unit and an inverter configured to receive power generated by the at least one power generation unit. The inverter includes a first bridge and a second bridge, wherein each of the first bridge and the second bridge includes at least one switch. The power generation system also includes an inductor including a first winding coupled to an output of the first bridge and a second winding coupled to an output of the second bridge.

In yet another embodiment, a method of converting power is provided that includes receiving direct current (DC) power and channeling the DC power through an inverter including a first bridge and a second bridge, wherein each of the first bridge and the second bridge includes at least one switch. The at least one switch of the first bridge and the at least one switch of the second bridge are controlled to convert the DC power to alternating current (AC) power, and the AC power is channeled through an inductor that includes a first winding and a second winding, wherein the first winding is coupled to an output of the first bridge and the second winding is coupled to an output of the second bridge.

DETAILED DESCRIPTION OF THE INVENTION

As described herein, a power generation system includes a power converter system and at least one power generation unit. The power generation unit is a renewable energy power generation unit that generates power from a renewable energy source. Such renewable energy sources may include wind, solar, geothermal, hydro, biomass, and/or any other renewable energy source. The power converter system includes a converter coupled to the power generation unit, and an inverter coupled to the converter by a DC bus. The inverter is coupled to an electrical distribution network for supplying electrical energy to the network. A control system controls the operation of the converter and the inverter. The inverter includes three inverter phases that each includes a plurality of bridges. Each bridge includes two switches coupled together in series. Each inverter phase is coupled to a separate inductor, and each inductor includes a plurality of windings positioned about a common core. An output of each bridge is coupled to a separate winding of the inductor. As such, the power converter systems described herein provide a high effective inductance for filtering power provided to an electrical distribution network while reducing a cost of the inductors used within the power converter systems.

Figure 1:
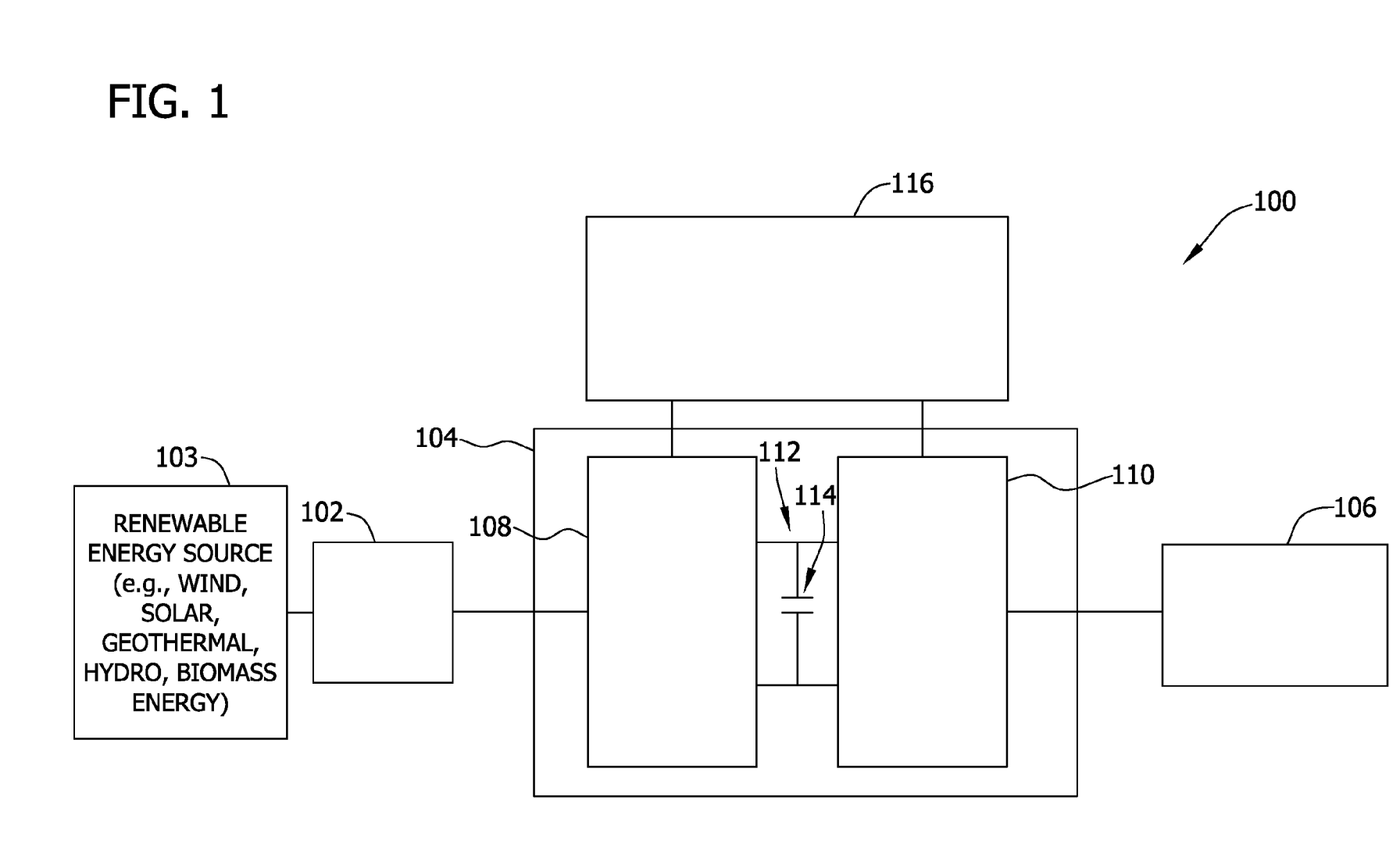
FIG. 1 is a schematic diagram of an exemplary power generation system.

FIG. 1 is a schematic diagram of an exemplary power generation system 100 that includes at least one power generation unit 102. Power generation unit 102 includes a wind turbine, a solar panel or array, a fuel cell, a geothermal generator, a hydropower generator, and/or any other device that generates electrical power from at least one renewable energy source 103. More specifically, in the exemplary embodiment, power generation unit 102 generates direct current (DC) electrical power from at least one renewable energy source 103. Alternatively, power generation unit 102 is a gas turbine, a steam turbine, and/or any other device that generates DC or alternating current (AC) power from a non-renewable energy source.

In the exemplary embodiment, power generation unit 102 is coupled to a power converter system 104, or a power converter 104. DC power generated by power generation unit 102 is transmitted to power converter system 104, and power converter system 104 converts the DC power to AC power. The AC power is transmitted to an electrical distribution network 106, or "grid." Power converter system 104, in the exemplary embodiment, adjusts an amplitude of the voltage and/or current of the converted AC power to an amplitude suitable for electrical distribution network 106, and provides AC power at a frequency and a phase that are substantially equal to the frequency and phase of electrical distribution network 106. Moreover, in the exemplary embodiment, power converter system 104 provides three phase AC power to electrical distribution network 106. Alternatively, power converter system 104 provides single phase AC power or any other number of phases of AC power to electrical distribution network 106.

In the exemplary embodiment, power converter system 104 includes a DC to DC, or "boost," converter 108 and an inverter 110 coupled together by a DC bus 112. Alternatively, power converter system 104 may include an AC to DC converter 108 for use in converting AC power received from power generation unit 102 to DC power, and/or any other converter 108 that enables power converter system 104 to function as described herein. In one embodiment, power converter system 104 does not include converter 108, and inverter 110 is coupled to power generation unit 102 by DC bus 112 and/or by any other device or conductor. In the exemplary embodiment, inverter 110 is a DC to AC inverter 110 that converts DC power received from converter 108 into AC power for transmission to electrical distribution network 106. Moreover, in the exemplary embodiment, DC bus 112 includes at least one capacitor 114. Alternatively, DC bus 112 includes a plurality of capacitors 114 and/or any other electrical power storage devices that enable power converter system 104 to function as described herein. As current is transmitted through power converter system 104, a voltage is generated across DC bus 112 and energy is stored within capacitors 114.

Power converter system 104 includes a control system 116 coupled to converter 108 and/or to inverter 110. In the exemplary embodiment control system 116 includes and/or is implemented by at least one processor. As used herein, the processor includes any suitable programmable circuit such as, without limitation, one or more systems and microcontrollers, microprocessors, reduced instruction set circuits (RISC), application specific integrated circuits (ASIC), programmable logic circuits (PLC), field programmable gate arrays (FPGA), and/or any other circuit capable of executing the functions described herein. The above examples are exemplary only, and thus are not intended to limit in any way the definition and/or meaning of the term "processor."

In the exemplary embodiment, control system 116 controls and/or operates converter 108 to adjust or maximize the power received from power generation unit 102. Moreover, in the exemplary embodiment, control system 116 controls and/or operates inverter 110 to regulate the voltage across DC bus 112 and/or to adjust the voltage, current, phase, frequency, and/or any other characteristic of the power output from inverter 110 to substantially match the characteristics of electrical distribution network 106.

Figure 2:
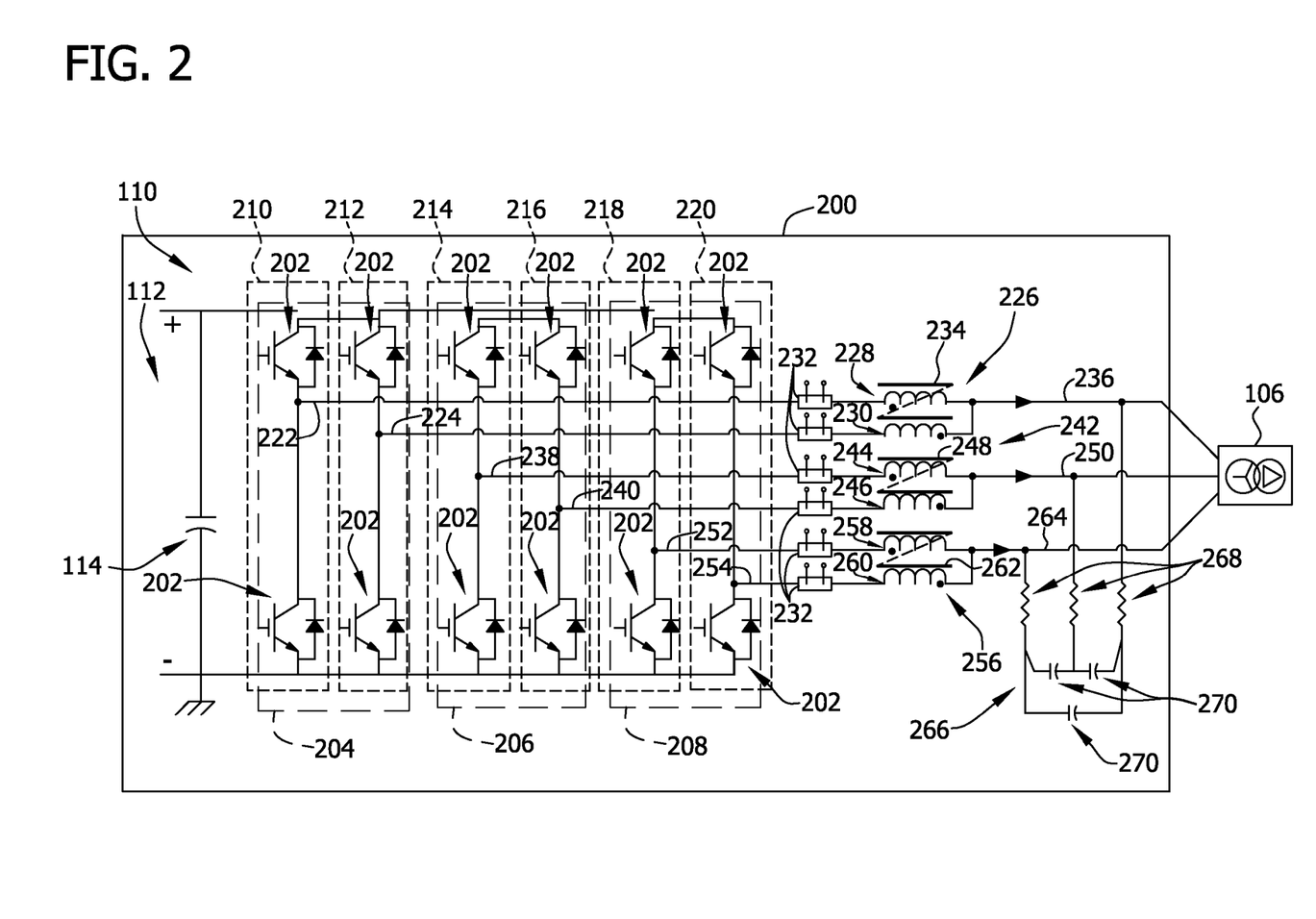
FIG. 2 is a schematic diagram of a portion of an exemplary power converter system that may be used with the power generation system shown in FIG. 1.

FIG. 2 is a schematic diagram of a portion of an exemplary power converter system 200 that may be used with power generation system 100 (shown in FIG. 1). In the exemplary embodiment, inverter 110 includes four inverter switches 202 coupled together for each phase of electrical power that power converter system 200 produces. Alternatively, inverter 110 includes any suitable number of inverter switches 202 for each phase of electrical power that enables inverter 110 and/or power converter system 200 to function as described herein. In the exemplary embodiment, inverter switches 202 are insulated gate bipolar transistors (IGBTs). Alternatively, inverter switches 202 are any other suitable transistor or any other suitable switching device.

In the exemplary embodiment, inverter 110 includes a first inverter phase 204, a second inverter phase 206, and a third inverter phase 208. First inverter phase 204 provides AC power corresponding to a first phase of electrical distribution network 106, second inverter phase 206 provides AC power corresponding to a second phase of electrical distribution network 106, and third inverter phase 208 provides AC power corresponding to a third phase of electrical distribution network 106. Moreover, in the exemplary embodiment, first inverter phase 204 includes a first phase first bridge 210 and a first phase second bridge 212. Each of first phase first bridge 210 and first phase second bridge 212 includes two inverter switches 202 coupled together in series. The series-coupled inverter switches 202 of first phase first bridge 210 are coupled in parallel with the series-coupled inverter switches 202 of first phase second bridge 212 (i.e., first phase first bridge 210 is coupled in parallel with first phase second bridge 212).

Each of second inverter phase 206 and third inverter phase 208 are configured in a similar manner to first inverter phase 204. Accordingly, second inverter phase 206 includes a second phase first bridge 214 coupled in parallel with a second phase second bridge 216, and third inverter phase 208 includes a third phase first bridge 218 coupled in parallel with a third phase second bridge 220. Each of second phase first bridge 214, second phase second bridge 216, third phase first bridge 218, and third phase second bridge 220 includes two inverter switches 202 coupled together in series. Alternatively, first inverter phase 204, second inverter phase 206, and/or third inverter phase 208 may include any suitable number and/or configuration of bridges and/or inverter switches 202.

In the exemplary embodiment, a first phase first conductor 222 is coupled between the two inverter switches 202 of first phase first bridge 210 and a first phase second conductor 224 is coupled between the two inverter switches 202 of first phase second bridge 212. First phase first conductor 222 transmits current from first phase first bridge 210 to a first inductor 226 that includes a first winding 228 and a second winding 230. As used herein, a "winding" includes at least one conductor arranged in one or more loops or "turns" such that the winding is substantially shaped as a coil.

In the exemplary embodiment, first phase first conductor 222 is coupled to first winding 228 of first inductor 226. A current sensor 232 is coupled to first phase first conductor 222 for use in measuring the current transmitted through conductor 222 and through first winding 228. First phase second conductor 224 transmits current from first phase second bridge 212 to second winding 230. A current sensor 232 is coupled to first phase second conductor 224 for use in measuring the current transmitted through conductor 224 and through second winding 230. Moreover, first winding 228 and second winding 230 are positioned about a common inductor core 234 such that first winding 228 and second winding 230 are magnetically coupled to inductor core 234 when current is transmitted through first winding 228 and second winding 230.

While FIG. 2 illustrates inductor core 234 separated into two components, this is merely for clarity of illustration. In the exemplary embodiment, inductor core 234 is a single continuous metal or metallic structure, and first winding 228 and second winding 230 are positioned about separate sections or portions of inductor core 234. As such, the dotted lines shown in FIG. 2 indicate that each section of inductor core 234 is connected to, and formed integrally with, each other section. An output of first winding 228 and an output of second winding 230 are coupled to a first phase output conductor 236 that transmits current from first winding 228 and second winding 230 to electrical distribution network 106. Additional inductor cores and windings are illustrated in a similar manner in FIGS. 2-4.

A second phase first conductor 238 is coupled between the two inverter switches 202 of second phase first bridge 214 and a second phase second conductor 240 is coupled between the two inverter switches 202 of second phase second bridge 216. Second phase first conductor 238 transmits current from second phase first bridge 214 to a second inductor 242 that includes a first winding 244 and a second winding 246. More specifically, second phase first conductor 238 is coupled to first winding 244 of second inductor 242. A current sensor 232 is coupled to second phase first conductor 238 for use in measuring the current transmitted through conductor 238 and through first winding 244. Second phase second conductor 240 transmits current from second phase second bridge 216 to second winding 246. A current sensor 232 is coupled to second phase second conductor 240 for use in measuring the current transmitted through conductor 240 and through second winding 246. Moreover, first winding 244 and second winding 246 are positioned about a common inductor core 248 such that first winding 244 and second winding 246 are magnetically coupled to inductor core 248 when current is transmitted through first winding 244 and second winding 246. An output of first winding 244 and an output of second winding 246 are coupled to a second phase output conductor 250 that transmits current from first winding 244 and second winding 246 to electrical distribution network 106.

In the exemplary embodiment, a third phase first conductor 252 is coupled between the two inverter switches 202 of third phase first bridge 218 and a third phase second conductor 254 is coupled between the two inverter switches 202 of third phase second bridge 220. Third phase first conductor 252 transmits current from third phase first bridge 218 to a third inductor 256 that includes a first winding 258 and a second winding 260. More specifically, third phase first conductor 252 is coupled to first winding 258 of third inductor 256. A current sensor 232 is coupled to third phase first conductor 252 for use in measuring the current transmitted through conductor 252 and through first winding 258. Third phase second conductor 254 transmits current from third phase second bridge 220 to second winding 260. A current sensor 232 is coupled to third phase second conductor 254 for use in measuring the current transmitted through conductor 254 and through second winding 260. Moreover, first winding 258 and second winding 260 are positioned about a common inductor core 262 such that first winding 258 and second winding 260 are magnetically coupled to inductor core 262 when current is transmitted through first winding 258 and second winding 260. An output of first winding 258 and an output of second winding 260 are coupled to a third phase output conductor 264 that transmits current from first winding 258 and second winding 260 to electrical distribution network 106.

An AC filter 266 is coupled to first phase output conductor 236, second phase output conductor 250, and third phase output conductor 264 for use in filtering and/or removing undesired frequency components from the current transmitted through conductors 236, 250, and 264. AC filter 266 includes at least one resistor 268 coupled to each of first phase output conductor 236, second phase output conductor 250, and/or third phase output conductor 264. Moreover, AC filter 266 includes at least one capacitor 270 coupled between first phase output conductor 236 and second phase output conductor 250, between second phase output conductor 250 and third phase output conductor 264, and/or between first phase output conductor 236 and third phase output conductor 264. Alternatively, AC filter 266 may include any suitable configuration of resistors 268 and/or capacitors 270 that enables AC filter 266 to function as described herein.

In the exemplary embodiment, three phase AC power is provided to electrical distribution network 106 by inverter 110. More specifically, a first phase of AC power is supplied to electrical distribution network 106 by first phase output conductor 236, a second phase of AC power is supplied to network 106 by second phase output conductor 250, and a third phase of AC power is supplied to network 106 by third phase output conductor 264.

During operation, in the exemplary embodiment, power generation unit 102 (shown in FIG. 1) generates DC power and transmits or channels the DC power to converter 108. Control system 116 controls and/or operates converter 108, for example, by adjusting the voltage and/or current received from power generation unit 102 such that the power received from power generation unit 102 is increased and/or maximized. The DC power is channeled through inverter 110, i.e., through first inverter phase 204, second inverter phase 206, and/or third inverter phase 208. Moreover, in the exemplary embodiment, control system 116 controls a switching of inverter switches 202 to adjust an output of inverter 110. More specifically, control system 116 uses a suitable control algorithm, such as pulse width modulation (PWM) and/or any other control algorithm, to transform the DC power received from converter 108 into three phase AC power signals. Alternatively, control system 116 causes inverter 110 to transform the DC power into a single phase AC power signal or any other signal that enables power converter system 200 to function as described herein.

In the exemplary embodiment, control system 116 switches or operates inverter switches 202 of each inverter phase in a complementary or interleaved manner. More specifically, control system 116 transmits switching control signals to inverter switches 202 of first phase first bridge 210 and to inverter switches 202 of first phase second bridge 212 such that inverter switches 202 of first phase first bridge 210 have a duty cycle offset by about 180 degrees as compared to a duty cycle of inverter switches 202 of first phase second bridge 212. In one embodiment, if first inverter phase 204 includes three bridges coupled together in parallel, the duty cycle of inverter switches 202 of each bridge are offset by about 120 degrees with respect to each other. Alternatively, inverter switches 202 of first inverter phase 204 (i.e., of first phase first bridge 210 and of first phase second bridge 212) may be controlled by control system 116 in any suitable manner that enables inverter 110 to function as described herein. In the exemplary embodiment, control system 116 operates inverter switches 202 of second inverter phase 206 and of third inverter phase 208 in a similar manner as first inverter phase 204, although the duty cycle of inverter switches 202 of second inverter phase 206 and/or of third inverter phase 208 may be offset with respect to each other and/or with respect to first inverter phase 204. Such an interleaved switching of inverter switches 202 facilitates reducing a voltage ripple and/or a current ripple that may otherwise be generated as a result of the conversion of the DC power to AC power by inverter 110.

Current is transmitted or channeled from first inverter phase 204, second inverter phase 206, and third inverter phase 208 to first inductor 226, second inductor 242, and third inductor 256, respectively. First inductor 226, second inductor 242, and third inductor 256 facilitate reducing the voltage ripple and/or the current ripple generated by inverter 110. Moreover, the common core and multiple winding structure of first inductor 226, second inductor 242, and third inductor 256 facilitates providing a high effective inductance to the current transmitted through inductors 226, 242, and 258, while reducing a size of inductor cores 234, 248, and 262. Accordingly, using first inductor 226, second inductor 242, and third inductor 256 within power converter system 200 is more cost-effective as compared to using known inductors that do not include a common core and multiple winding structure.

Figure 3:
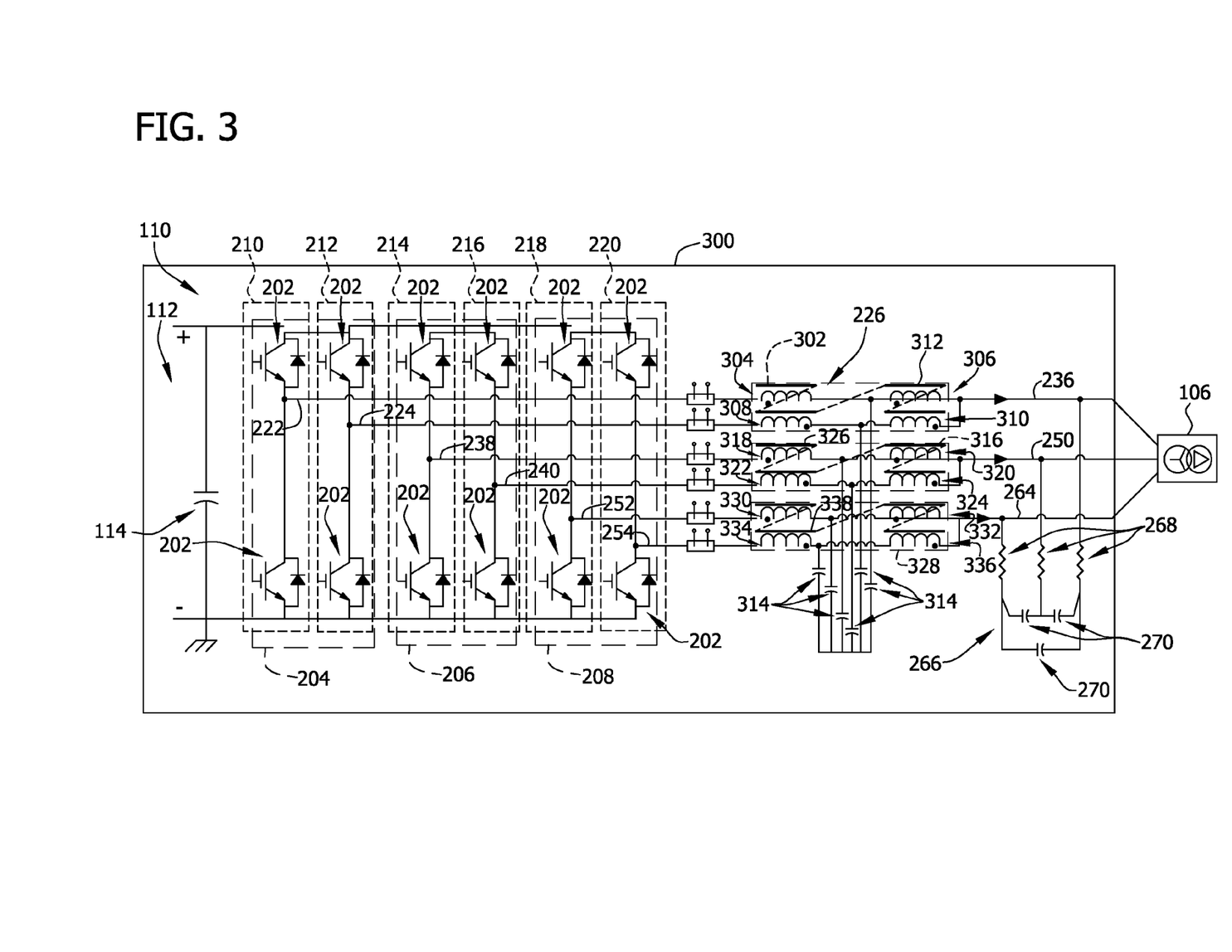
FIG. 3 is a schematic diagram of a portion of another exemplary power converter system that may be used with the power generation system shown in FIG. 1.

FIG. 3 is a schematic diagram of a portion of another exemplary power converter system 300 that may be used with power generation system 100 (shown in FIG. 1). Unless otherwise specified, power converter system 300 is substantially similar to power converter system 200 (shown in FIG. 2), and components of FIG. 3 that are similar to components of FIG. 2 are illustrated with the same reference numerals in FIG. 3 as are used in FIG. 2.

In the exemplary embodiment, a first inductor 302 is coupled to an output of first phase first bridge 210 and first phase second bridge 212, i.e., to first phase first conductor 222 and to first phase second conductor 224. First inductor 302 includes a first winding 304, a second winding 306, a third winding 308, and a fourth winding 310. Moreover, first inductor 302 includes a common inductor core 312, and first winding 304, second winding 306, third winding 308, and fourth winding 310 are positioned about separate sections or portions of inductor core 312. In the exemplary embodiment, first phase first conductor 222 is coupled to first winding 304 and second winding 306, and first phase second conductor 224 is coupled to third winding 308 and fourth winding 310.

At least one filter capacitor 314 is coupled to each of first phase first conductor 222 and first phase second conductor 224. More specifically, in the exemplary embodiment, at least one filter capacitor 314 is coupled to first phase first conductor 222 between first winding 304 and second winding 306. Moreover, at least one filter capacitor 314 is coupled to first phase second conductor 224 between third winding 308 and fourth winding 310. In one embodiment, filter capacitor 314 is coupled at a midpoint (not shown) between first winding 304 and second winding 306 and at a midpoint (not shown) between third winding 308 and fourth winding 310. Alternatively, filter capacitor 314 may be coupled to any suitable location of first phase first conductor 222 and/or first phase second conductor 224.

In the exemplary embodiment, a second inductor 316 is coupled to an output of second phase first bridge 214 and second phase second bridge 216, i.e., to second phase first conductor 238 and to second phase second conductor 240. Second inductor 316 includes a first winding 318, a second winding 320, a third winding 322, and a fourth winding 324 positioned about separate sections or portions of a common inductor core 326. In the exemplary embodiment, second phase first conductor 238 is coupled to first winding 318 and second winding 320, and second phase second conductor 240 is coupled to third winding 322 and fourth winding 324. At least one filter capacitor 314 is coupled between first winding 318 and second winding 320, and at least one filter capacitor 314 is coupled between third winding 322 and fourth winding 324.

In a similar manner, a third inductor 328 is coupled to an output of third phase first bridge 218 and third phase second bridge 220, i.e., to third phase first conductor 252 and to third phase second conductor 254. Third inductor 328 includes a first winding 330, a second winding 332, a third winding 334, and a fourth winding 336 positioned about separate sections or portions of a common inductor core 338. In the exemplary embodiment, third phase first conductor 252 is coupled to first winding 330 and second winding 332, and third phase second conductor 254 is coupled to third winding 334 and fourth winding 336. At least one filter capacitor 314 is coupled between first winding 330 and second winding 332, and at least one filter capacitor 314 is coupled between third winding 334 and fourth winding 336.

Filter capacitors 314, in the exemplary embodiment, are coupled together to form cascaded low pass filters. Accordingly, filter capacitors 314, first inductor 302, second inductor 316, and third inductor 328 enable undesired voltage ripples, current ripples, and/or undesired frequencies to be filtered from first phase first conductor 222, first phase second conductor 224, second phase first conductor 238, second phase second conductor 240, third phase first conductor 252, and/or third phase second conductor 254.

Figure 4:
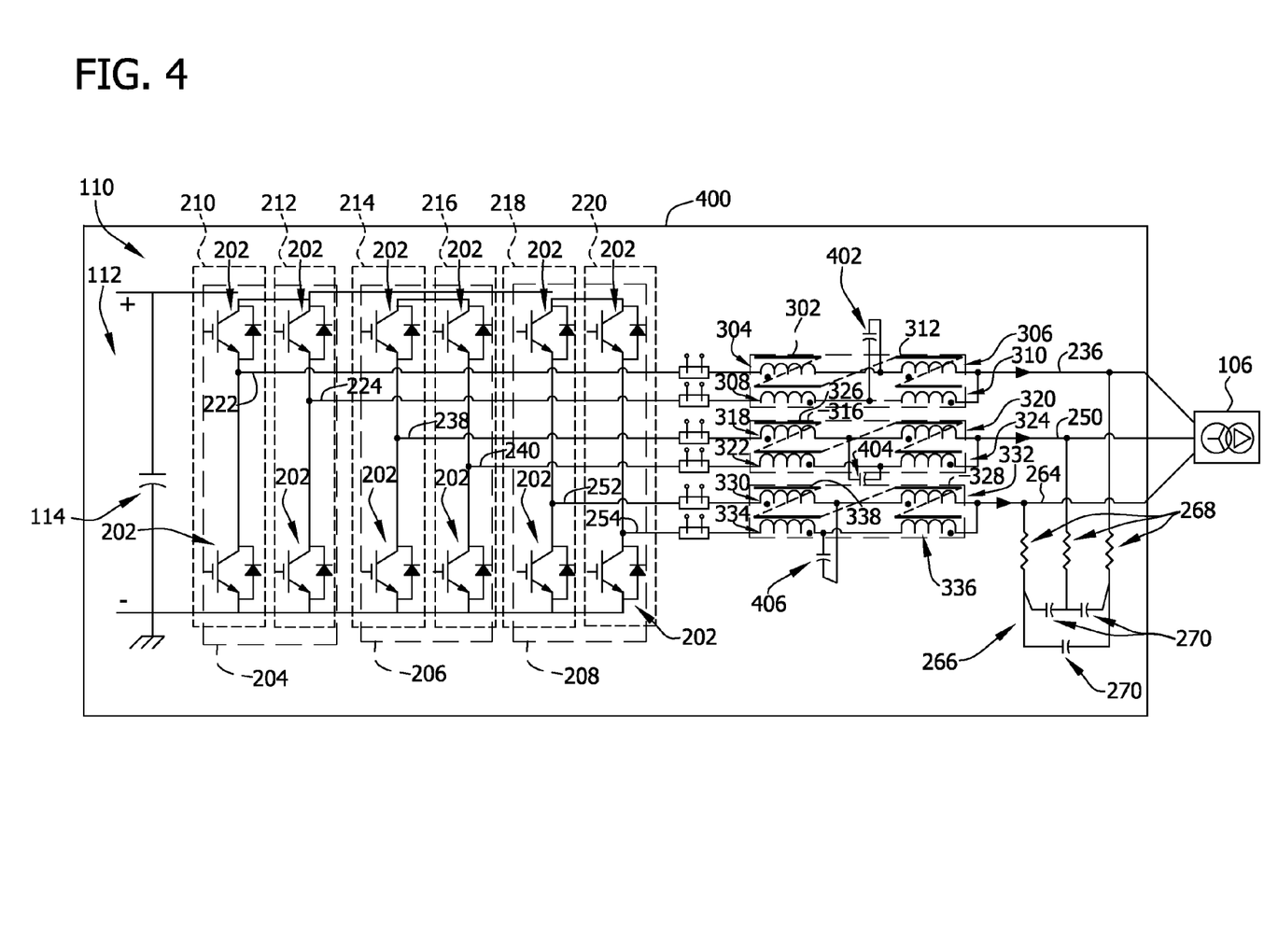
FIG. 4 is a schematic diagram of a portion of another exemplary power converter system that may be used with the power generation system shown in FIG. 1.

FIG. 4 is a schematic diagram of a portion of another exemplary power converter system 400 that may be used with power generation system 100 (shown in FIG. 1). Unless otherwise specified, power converter system 400 is substantially similar to power converter system 300 (shown in FIG. 3), and components of FIG. 4 that are similar to components of FIG. 3 are illustrated with the same reference numerals in FIG. 4 as are used in FIG. 3.

In the exemplary embodiment, at least one filter capacitor 402 is coupled to first phase first conductor 222 and to first phase second conductor 224 such that first phase first conductor 222 is coupled to first phase second conductor 224 through filter capacitor 402. More specifically, in the exemplary embodiment, filter capacitor 402 is coupled to first phase first conductor 222 between first winding 304 and second winding 306 of first inductor 302, and is coupled to first phase second conductor 224 between third winding 308 and fourth winding 310 of first inductor 302. In one embodiment, filter capacitor 402 is coupled at a midpoint (not shown) between first winding 304 and second winding 306 and at a midpoint (not shown) between third winding 308 and fourth winding 310. Alternatively, one or more filter capacitors 402 may be coupled to any suitable location of first phase first conductor 222 and/or first phase second conductor 224.

At least one filter capacitor 404 is coupled to second phase first conductor 238 between first winding 318 and second winding 320 of second inductor 316, and is coupled to second phase second conductor 240 between third winding 32 and fourth winding 324 of second inductor 316. In a similar manner, at least one filter capacitor 406 is coupled to third phase first conductor 252 between first winding 330 and second winding 332 of third inductor 328, and is coupled to third phase second conductor 254 between third winding 334 and fourth winding 336 of third inductor 328.

Filter capacitors 402, 404, and 406, in the exemplary embodiment, enable undesired voltage ripples, current ripples, and/or undesired frequencies to be filtered from first phase first conductor 222, first phase second conductor 224, second phase first conductor 238, second phase second conductor 240, third phase first conductor 252, and/or third phase second conductor 254. In contrast to the embodiment illustrated in FIG. 3, filter capacitors 402, 404, and 406 described herein with respect to FIG. 4 are not coupled together. Accordingly, fewer filter capacitors are required to be used in power converter system 400 and a total cost of power converter system 400 is reduced as compared to power converter system 300.

A technical effect of the systems and methods described herein includes at least one of: (a) receiving direct current (DC) power; (b) channeling DC power through an inverter including a first bridge and a second bridge, wherein each of the first bridge and the second bridge includes at least one switch; (c) controlling at least one switch of a first bridge and at least one switch of a second bridge to convert DC power to alternating current (AC) power; and (d) channeling AC power through an inductor that includes a first winding and a second winding, wherein the first winding is coupled to an output of a first bridge and the second winding is coupled to an output of a second bridge.

The above-described embodiments facilitate providing an efficient and cost-effective power converter system for use within a power generation system. The power converter system includes a converter configured to be coupled to a power generation unit, and an inverter coupled to the converter by a DC bus. The inverter is configured to be coupled to an electrical distribution network for supplying electrical energy to the network. A control system controls the operation of the converter and the inverter. The inverter includes three inverter phases that each includes a plurality of bridges. Each bridge includes two switches coupled together in series. Each inverter phase is coupled to a separate inductor, and each inductor includes a plurality of windings positioned about a common core. An output of each bridge is coupled to a separate winding of the inductor. As such, the power converter systems described herein provide a high effective inductance for filtering power provided to an electrical distribution network while reducing a cost of the inductors used within the power converter systems.

Exemplary embodiments of a power generation system, a power converter system, and methods for converting power are described above in detail. The power generation system, power converter system, and methods are not limited to the specific embodiments described herein, but rather, components of the power generation system and/or power converter system and/or steps of the methods may be utilized independently and separately from other components and/or steps described herein. For example, the power converter system may also be used in combination with other power systems and methods, and is not limited to practice with only the power generation system as described herein. Rather, the exemplary embodiment can be implemented and utilized in connection with many other renewable energy and/or power generation applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power converter system, comprising:
    an inverter comprising a first bridge and a second bridge, wherein each of said first bridge and said second bridge comprises at least one switch;
    a first inductor comprising:
        a first winding coupled to an output of said first bridge; and,
        a second winding coupled to an output of said second bridge;
    a second inductor; and,
    a filter circuit coupled to said first inductor and to said second inductor, said filter circuit comprising:
        a first resistor coupled to said second winding;
        a capacitor coupled to said first resistor; and,
        a second resistor coupled to said capacitor and to said second inductor.

2. A power converter system in accordance with claim 1, wherein said first inductor comprises an inductor core, wherein said first winding and said second winding are positioned about said inductor core.

3. A power converter system in accordance with claim 1, wherein said power converter system is configured to receive power from at least one power generation unit, said power conversion system further comprising a converter coupled to said inverter and configured to adjust the power received.

4. A power converter system in accordance with claim 1, wherein said power converter system is configured to receive power from at least one power generation unit, wherein the at least one power generation unit generates power from at least one of wind, solar, geothermal, hydro, and biomass energy.

5. A power converter system in accordance with claim 1, wherein an output of said first winding and an output of said second winding are configured to be coupled to an electrical distribution network to provide a first phase of alternating current power to the electrical distribution network.

6. A power converter system in accordance with claim 1, wherein said first bridge and said second bridge are coupled in parallel with each other.

7. A power converter system in accordance with claim 1, further comprising a control system coupled to said inverter, said control system configured to cause at least one switch of said first bridge to be switched with a first duty cycle and to cause said at least one switch of said second bridge to be switched with a second duty cycle, wherein the first duty cycle is different from the second duty cycle.

8. A power generation system, comprising:
    at least one power generation unit;
    an inverter configured to receive power generated by said at least one power generation unit, said inverter comprising a first bridge and a second bridge, wherein each of said first bridge and said second bridge comprises at least one switch;
    a first inductor comprising:
        a first winding coupled to an output of said first bridge; and,
        a second winding coupled to an output of said second bridge;
    a second inductor; and,
    a filter circuit coupled to said first inductor and to said second inductor, said filter circuit comprising:
        a first resistor coupled to said second winding;
        a capacitor coupled to said first resistor; and,
        a second resistor coupled to said capacitor and to said second inductor.

9. A power generation system in accordance with claim 8, wherein said first inductor comprises an inductor core, wherein said first winding and said second winding are positioned about said inductor core.

10. A power generation system in accordance with claim 8, further comprising a converter coupled to said inverter and to said at least one power generation unit, said converter configured to receive power generated by said at least one power generation unit and to adjust the power received.

11. A power generation system in accordance with claim 8, wherein said at least one power generation unit generates power from at least one of wind, solar, geothermal, hydro, and biomass energy.

12. A power generation system in accordance with claim 8, wherein an output of said first winding and an output of said second winding are configured to be coupled to an electrical distribution network to provide a first phase of alternating current power to the electrical distribution network.

13. A power generation system in accordance with claim 8, wherein said first bridge and said second bridge are coupled in parallel with each other.

14. A power generation system in accordance with claim 8, further comprising a control system coupled to said inverter, said control system configured to cause said at least one switch of said first bridge to be switched with a first duty cycle and to cause said at least one switch of said second bridge to be switched with a second duty cycle, wherein the first duty cycle is different from the second duty cycle.

15. A method of converting power, said method comprising:
- receiving direct current (DC) power;
- channeling the DC power through an inverter including a first bridge and a second bridge, wherein each of the first bridge and the second bridge includes at least one switch;
- controlling the at least one switch of the first bridge and the at least one switch of the second bridge to convert the DC power to alternating current (AC) power;
- channeling the AC power through a first inductor that includes a first winding and a second winding, wherein the first winding is coupled to an output of the first bridge and the second winding is coupled to an output of the second bridge; and,
- filtering the AC power by a filter circuit coupled to the first inductor and to a second inductor, wherein the filter circuit includes a first resistor coupled to the second winding, a capacitor coupled to the first resistor, and a second resistor coupled to the capacitor and to the second inductor.

16. A method in accordance with claim 15, wherein the first inductor includes an inductor core and the first winding and the second winding are positioned about the inductor core, wherein said channeling the AC power through a first inductor comprises channeling the AC power through the first winding and the second winding.

17. A method in accordance with claim 15, further comprising channeling the DC power through a converter to adjust the DC power.

18. A method in accordance with claim 15, further comprising coupling an output of the first winding and an output of the second winding to an electrical distribution network to supply the AC power to the electrical distribution network.

19. A method in accordance with claim 18, further comprising providing a first phase of the AC power to the electrical distribution network when the output of the first winding and the output of the second winding are coupled to the electrical distribution network.

20. A method in accordance with claim 15, further comprising controlling the at least one switch of the first bridge to be switched with a first duty cycle and controlling the at least one switch of the second bridge to be switched with a second duty cycle, wherein the first duty cycle is different from the second duty cycle.

* * * * *